D. J. GILBERT.
OILING AND PROTECTING MEANS FOR BALL BEARINGS, &c.
APPLICATION FILED SEPT. 16, 1919.
1,337,597.
Patented Apr. 20, 1920.
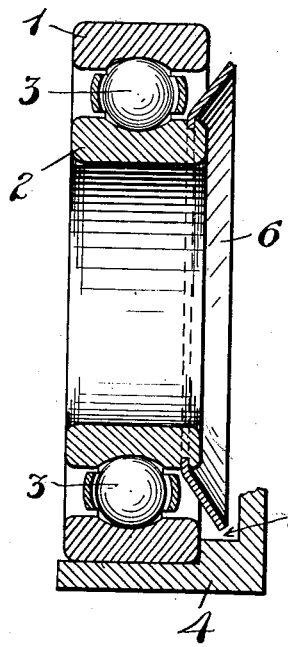
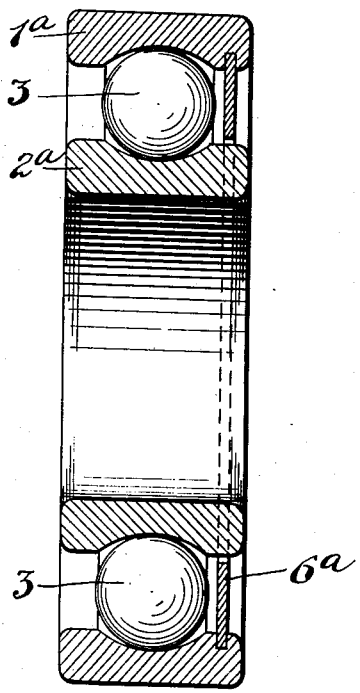
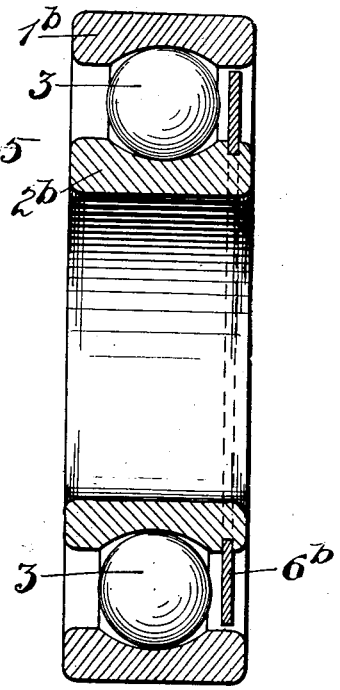
Daniel J. Gilbert, Inventor,
By his Attorneys
Mitchell & Allyn.

UNITED STATES PATENT OFFICE.

DANIEL JOSEPH GILBERT, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

OILING AND PROTECTING MEANS FOR BALL-BEARINGS, &c.

1,337,597.   Specification of Letters Patent.   Patented Apr. 20, 1920.

Application filed September 16, 1919. Serial No. 324,209.

*To all whom it may concern:*

Be it known that I, DANIEL J. GILBERT, a citizen of the United States of America, residing at New Britain, Connecticut, have invented a new and useful Oiling and Protecting Means for Ball-Bearings, &c., of which the following is a specification.

My invention relates to oiling and protecting means for ball bearings and the like, the object being to provide an exceedingly simple and compact means to that end.

In the drawing—

Figure 1 is a cross section of a ball bearing constructed to embody my invention and showing the lower part of bearing housing.

Fig. 2 is a similar view of a modification wherein the device serves merely to perform the function of a protector the protector housing being omitted.

Fig. 3 is a similar view of a further modification.

In Fig. 1, 1—2 are the outer and inner bearing rings of a ball bearing. 3—3 are balls arranged in a series between said rings. These rings are grooved to receive and hold said balls while the balls in turn serve to hold said rings against independent lateral displacement. 4 illustrates the lower portion of a housing in which the bearing is held. 5 illustrates the lower part of a groove or channel such as is customarily found in such housings at one side of the bearing. The lower part of this groove or space forms an oil pocket. In Fig. 1 of the drawings the outer circumference of the inner rotatable ring 2 is provided with suitable means such as two shoulders formed by a groove for holding an oiling device 6. This device is preferably made of relatively thin sheet metal in the form of an annular dished ring, the inner edge of which projects into said groove so as to be held by said holding shoulders. The outer edge of the said ring clears the adjacent edge of the outer bearing ring 1 and projects into the oil pocket 5 since the outside diameter of said ring is greater than the internal diameter of the bearing ring 1.

In operation: As the bearing ring 2 revolves the ring 6 revolves therewith and dips into the oil pocket 5 so that the outer edge of said ring will carry a small quantity of oil which will work down the inclined wall thereof from the top toward the balls 3, so as to lubricate the bearing. It is preferred that the outer edge of the ring 6 be smooth although obviously this is not essential in all cases. It is apparent that, to a certain extent, the ring 6 serves to protect the adjacent side of the bearing.

In the modification as shown in Fig. 2 the ring $6^a$ is primarily a protector and is not dished as in the former case. This ring $6^a$ projects into a groove in the inner wall of the outer ring $1^a$ and is contained wholly between said ring and the ring $2^a$.

In Fig. 3 the protector ring $6^b$ is carried by a groove in the outer wall of the inner ring $2^b$ and is contained wholly between said ring and ring $1^b$. Here again the function of the ring $6^b$ is merely that of a protector. When the ring is to serve merely as a protecting means it is preferred to mount it upon the stationary bearing ring which is sometimes the outer one as in Fig. 2, and at other times the inner one as in Fig. 3.

It is not necessary to specially design either of the bearing rings in order to receive the oiling or protector ring since the same is secured to the outer wall of the ordinary inner bearing ring, or the inner wall of the ordinary outer bearing ring, a simple method of attachment being provided by means of shoulders formed by recessing or grooving said walls so as to form holding shoulders as shown in the several views of the drawing.

In the construction shown in Figs. 1 and 3, the inner edge of the annular plate is of lesser diameter than the outer diameter of the inner bearing ring where said parts engage, whereas in Fig. 2, the external diameter of the annular plate is greater than the internal diameter of the outer ring where said parts engage. The edge of the annular plate may be snapped or forced into the retaining groove in the bearing ring when a groove is provided, but in some cases the tension of the plate on or in the ring may be such as to avoid the necessity of a groove.

It is possible in some instances that the annular plate may be secured friction-tight against that wall of the bearing ring which supports it so that the groove may be dispensed with. For example, in the case of the dished plate the same may be forced over the inner ring with sufficient gripping action to retain it without the necessity of a groove.

I claim:—

1. In a ball bearing, two bearing rings having complementary grooved faces with balls therebetween to hold said rings against separation, one of said rings having an annular groove substantially in a plane which would pass through both rings when the bearing is assembled, and an endless annular plate seated in said groove and free from said balls.

2. In a ball bearing, two bearing rings having complementary grooved faces with balls therebetween to hold said rings against separation, an annular dished plate secured to the inner ring, the outside diameter of said plate being greater than the inside diameter of the outer ring and arranged to dip into an oil pocket at the side of said bearing to pick up oil and convey it inwardly into said bearing to lubricate the balls and race-way grooves.

DANIEL JOSEPH GILBERT.